United States Patent [19]
Buehler et al.

[11] 3,843,695
[45] Oct. 22, 1974

[54] ANTHRAQUINONE DYESTUFFS

[75] Inventors: Arthur Buehler, Rheinfelden; Hans Ulrich Schuetz, Basel; Gerd Hoelzle, Liestal, all of Switzerland

[73] Assignee: Ciba-Geigy AG, Basel, Switzerland

[22] Filed: July 25, 1972

[21] Appl. No.: 275,027

Related U.S. Application Data

[63] Continuation of Ser. No. 29,659, April 17, 1970, abandoned, which is a continuation-in-part of Ser. No. 659,589, Aug. 10, 1967, abandoned.

[30] Foreign Application Priority Data

Aug. 16, 1966 Switzerland.................... 11816/66

[52] U.S. Cl..................... 260/372, 8/39, 260/153, 260/247.1 A, 260/249, 260/256.5 R, 260/262, 260/303
[51] Int. Cl............................................ C09b 1/40
[58] Field of Search.................................... 260/372

[56]  References Cited
UNITED STATES PATENTS
3,316,239  4/1967  Riat et al. ........................ 260/372
3,365,472  1/1968  Buehler et al. .................... 260/372

FOREIGN PATENTS OR APPLICATIONS
830,876   3/1960   Great Britain..................... 260/372
885,815  12/1961   Great Britain..................... 260/372

Primary Examiner—Lorraine A. Weinberger
Assistant Examiner—E. Jane Skelly
Attorney, Agent, or Firm—Joseph G. Kolodny; Edward McC. Roberts; Prabodh I. Almaula

[57]  ABSTRACT

Reactive 1-amino-4-carboxyphenylamino-anthraquinone-2-sulfonic acid dyestuffs containing a fiber-reactive acylamino radical in 4-position of the external phenyl radical and method for their preparation.

6 Claims, No Drawings

ANTHRAQUINONE DYESTUFFS

CROSS-REFERENCE TO RELATED APPLICATIONS

This is a continuation of application Ser. No. 29,659, filed Apr. 17, 1970, now abandoned, which in turn is a continuation-in-part of application Ser. No. 659,589, filed Aug. 10, 1967 (now abandoned).

The present invention provides new dyestuffs of the anthraquinone series corresponding to the general formula (1)

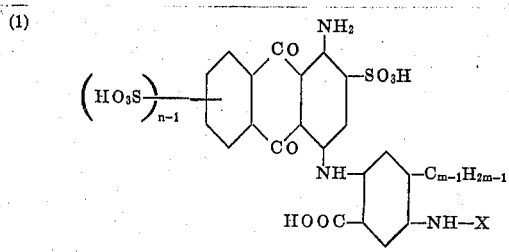

in which $m$ and $n$ each equals 1 or 2 and X represents a fibre-reactive residue, preferably an unsaturated aliphatic acyl radical, bound to the —NH— bridge through a —CO— group, for example a mono- or dichloro-1,3,5-triazyl, a di— or trichloropyrimidyl residue or a dichloroquinoxaline-carboxylic acid residue, a dichlorophthalazine-carboxylic acid residue, a dichloropyridazone-propionic acid or a 2-chlorobenzthiazole-carboxylic acid residue or especially a mono- or dihalogenopropionyl, halogenocrotonyl, acryl or halogenoacryl residue.

These new dyestuffs can be manufactured by acylation (condensation) or by elimination of hydrogen halide. For example, anthraquinone dyestuffs of the formula (2)

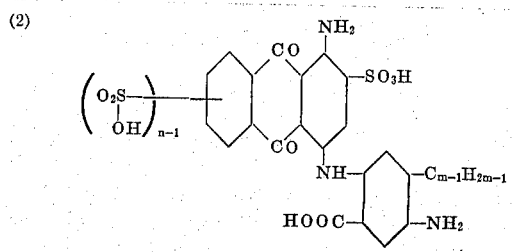

can be condensed with acylating agents that contain in addition to the acylating group the residue of a fibre-reactive compound, for example with heterocyclic halides or with halides or anhydrides of a carboxylic acid containing a fibre-reactive, preferably unsaturated aliphatic acyl radical. As such acylating agents the following, for example, may be mentioned: di- and trihalogeno-1,3,5-triazines for example cyanuric chloride and cyanuric bromide and the monocondensation products obtained therefrom with ammonia, amines, alcohols, phenols or mercaptans, as well as 2-methyl- or 2-phenyl-4,6-dichloro-1,3,5-triazine, 2-methanesulphonyl-4-chloro-6-methylpyrimidine, 2-methanesulphonyl-4,5-dichloro-6-methylpyrimidine, tri- and tetrachloropyrimidines, acid halides of dichloroquinoxaline-carboxylic acids, dichlorophthalazine-carboxylic acid chlorides, dichloropyridazoneepropionylchlorides, 2-chlorobenzthiazolecarboxylic acid chlorides, dichloropropionic acid anhydrides, or especially the following acid halides: acrylic acid halides, chloroacetylchloride and halogenoacrylic acid halides, for example α-bromoacrylic acid chloride.

The starting anthraquinone dyestuffs can be made, for example, from a 1-amino-4-(4'-acylamino-2'-carboxyphenylamino)-anthraquinone-2-sulphonic acid or a 1-amino-4-(4'-acylamino-2'-carboxyphenylamino)-anthraquinone-2,5-, -2,8- or especially -2,6- or -2,7-disulphonic acid, obtained by condensing 4-acylamino-1-aminobenzene-2-carboxylic acid with 4-bromo-1-aminoanthraquinone-2-sulphonic acid or with 4-bromo-1-aminoanthraquinone-2,5-, -2,6-, -2,7- or -2,8-disulphonic acid, or from mixtures thereof, by hydrolysis or by direct condensation of 1-amino-4-bromoanthraquinone 2,5-, -2,6-, -2,7- or -2,8-disulphonic acid or 1-amino-4-bromoanthraquinone-2-sulphonic acid respectively with 1,4-diaminobenzene-2-carboxylic acid.

In accordance with the invention the acylation (condensation) of the indicated starting dyestuffs with the said acylating agents, which contain an acylating group and a fibre-reactive residue, is advantageously carried out in the presence of an acid acceptor for example sodium acetate, hydroxide or carbonate, preferably in an aqueous medium. It is advantageous to use an excess of the acylating agent and to carry out the acylation at a pH value from 5 to 8.

According to another process of the present invention an anthraquinone dyestuff of the formula (3)

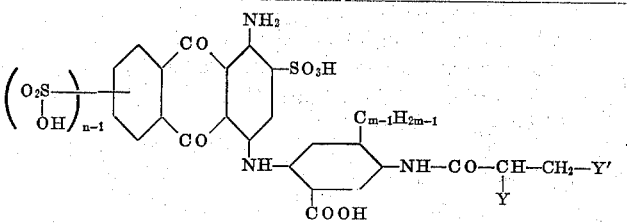

in which $m$ and $n$ each equals 1 or 2, Y' represents a halogen atom, especially a bromine atom, and Y a hydrogen or halogen atom, is treated with an alkali to eliminate hydrogen halide.

According to a further process of the present invention the bromine atom in 2-position in a dyestuff of the formula (4)

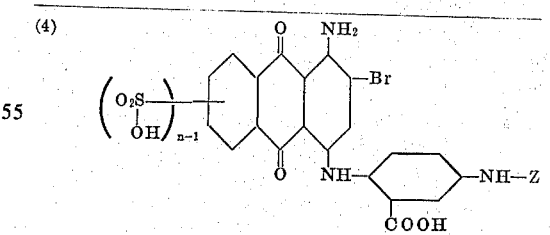

where $n = 1$ or 2 and Z represents a monohalogenopropionyl or acryl radical, can be replaced by a sulphonic acid group by treatment in the usual manner, for example with sodium sulphite.

The dyestuffs of this invention which contain as the fibre-reactive substituent a monochloro- or monobromo-1,3,5-triazine residue, can also be obtained by replacing by means of ammonia or an amine one of the two halogen atoms in the 2,4-dihalogeno-1,3,5-triazine-aminoanthraquinone sulphonic acids obtained by condensation with cyanuric chloride or bromide. As such amines the following, for example, are suitable: methylamine, ethylamine, isopropylamine, methoxyethylamine, methoxypropylamine, dimethylamine, diethylamine, methylphenylamine, ethylphenylamine, chlorethylamine, ethanolamines, propanolamines, benzylamine, cyclohexylamine, morpholine, piperidine, piperazine, aminocarbonic acid esters, aminoacetoacetic acid ethyl ester, aminoethanesulphonic acid, N-methylaminoethanesulphonic acid, and above all aromatic amines for example aniline, N-methylaniline, toluidines, xylidines, chloroanilines, p- and m-aminoacetanilide, nitranilines, aminophenols, nitrotoluidines, phenylenediamines, toluylenediamines, anisidine, phenetidine, diphenylamine, naphthylamines, aminonaphthols, diaminonaphthalenes, and especially anilines that contain acid groups for example sulphanilic, metanilic, orthanilic acid, anilinedisulphonic acid, aminobenzoic acid, naphthylaminomono-, -di- and -tri-sulphonic acids, aminobenzoic acid, naphthylamino-mono-, -di- and -tri-sulphonic acids, aminobenzoic acid-sulphonic acid, 1-hydroxy-5-aminobenzoic acid, aminonaphthol-mono-, -di- and -tri-sulphonic acids and the like; also coloured compounds and compounds having dyestuff characteristics, for example 4-nitro-4'-aminostilbenedisulphonic acid and amino azo dyestuffs that contain at least one reactive amino group.

Both in the new monohalogenotriazine and the halogenopyrimidine derivatives the mobile halogen atoms of the fibre-reactive substituents are easy to replace, for example by reaction with a tertiary amine or with a hydrazine (for example dimethylhydrazine), whereby fibre-reactive dyestuffs are formed in which the eliminable substituent is a quaternary ammonium or hydrazinium group bound to a carbon atom, especially one belonging to a heterocyclic residue, for example a group of the formula

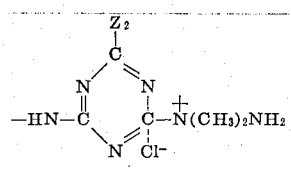

or

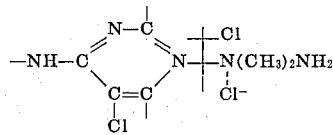

in which $Z_2$ represents a hydrogen atom, an unsubstituted or substituted amino group or an etherified hydroxyl or mercapto group.

The products of the formula (1) obtained by the present processes are new. They are valuable dyestuffs suitable for dyeing or printing a wide variety of materials, especially polyhydroxylated materials of fibrous structure, for example natural or regenerated cellulose, and nitrogenous textile materials, for example silk or wool, and synthetic fibres made from polyamides or polyurethanes.

When dyeing wool or polyamide fibres it is advantageous to add a levelling agent, especially an ethylene oxide adduct, for example with oleylamine or with tallow fat acid amides, to enhance the levelling capacity.

The dyestuffs of this invention may be applied, for example, to cellulose fibres by the direct dyeing method, by printing or by the so-called pad dyeing method and fixed on the fibre by a heat and alkali treatment. To improve the fastness properties it is advantageous to rinse the resulting dyeings or prints thoroughly in cold and hot water, if desired with addition of an agent having a dispersing action and promoting the diffusion of any unfixed dyestuff.

The dyestuffs of this invention which contain an aliphatic fibre-reactive residue are especially suitable for dyeing and printing of wool. They display a high affinity to wool fibres and a very good building-up capacity and thus cause high rates of dyeing. The dyeings and prints obtained are distinguished by the special purity of their shades, by a very good fastness to light and by outstanding properties of wet fastness, especially to fulling and washing.

Unless otherwise indicated, parts and percentages in the following Examples are by weight.

EXAMPLE 1

A mixture of 46.2 parts of potassium 1-amino-4-bromoanthraquinone-2,6-disulphonate, 300 parts of water, 18.3 parts of 1,4-diaminobenzene-2-carboxylic acid, 6 parts of sodium carbonate, 14 parts of sodium bicarbonate and 2 parts of copper sulphate is stirred at 70° to 75°C until the condensation is complete. Surprisingly, the main product formed is 1-amino-4-(4'-amino-2°-carboxyphenylamino)-anthraquinone-2,6-disulphonic acid which can be isolated in known manner, for example by precipitation and filtration; it forms a black powder which gives in water a greenish blue solution and in concentrated sulphuric acid a violet solution.

EXAMPLE 2

53.3 Parts of 1-amino-4-(4'-amino-2'-carboxyphenylamino)-anthraquinone-2,6-disulphonic acid are dissolved in 800 parts of water with addition of sufficient sodium hydroxide to obtain a neutral solution. The 24 parts of sodium bicarbonate are added and at 0° to 5°C the solution is mixed with 17 parts of α,β-dibromopropionylchloride. On completion of the reaction the acylated dyestuff is salted out with sodium chloride, filtered and dried; it forms a black powder which gives in water a blue solution and in concentrated sulphuric acid a violet solution. It dyes wool from a weakly acid bath in the presence of a levelling agent blue-green shades having good fastness properties.

When the 53.3 parts of 1-amino-4-(4'-amino-2'-carboxyphenylamino)-anthraquinone-2,6-disulphonic acid are replaced by a mixture of 26.65 parts of 1-amino-4-(4'-amino-2'-carboxyphenylamino)-anthraquinone-2,6-disulphonic acid and 26.65 parts of 1-amino-4-(4'-amino-2'-carboxyphenylamino)-anthraquinone-2,7-disulphonic acid, the procedure being otherwise identical, a dyestuff is obtained which dyes wool in the presence of a levelling agent a distinctly more bluish tint.

When the 1-amino-4-(4'-amino-2'-carboxyphenylamino)-anthraquinone-2,6-disulphonic acid is replaced by the corresponding amount of 1-amino-4-

(4'-amino-2'-carboxyphenylamino)-anthraquinone-2sulphonic acid as starting material a similar dyestuff results which dyes wool blue-green shades having good wet fastness properties.

EXAMPLE 3

A solution of 78.3 parts of the dibromopropionyl-dyestuff derivates obtained in Example 2 in 500 parts of water is cooled with ice to 10°C, and 12 parts by volume of 10N sodium hydroxide solution are added. The solution is stirred for 30 minutes at 10° to 15°C and neutralized with about 10 parts by volume of 2N hydrochloric acid, and the dyestuff is salted out with sodium chloride, filtered and dried under vacuum at 60° to 70°C. A readily water-soluble bromacryl derivatives is obtained which also dyes wool bluish green shades of equally good fastness properties.

EXAMPLE 4

When in Example 2 9 parts of chloroacetylchloride are used instead of 17 parts of α,β-dibromopropionyl-chloride, a dyestuff is obtained which possesses very similar properties.

EXAMPLE 5

A neutral solution is prepared by adding sodium hydroxide to 53.3 parts of a mixture of 1-amino-4-(4'-amino-2-carboxyphenyl-amino)-anthraquinone-2,5-disulphonic acid and the isomeric-2,8-disulphonic acid and 800 parts of water. Then 24 parts of sodium bicarbonate are added and the solution is mixed at 0° to 5°C with 35 parts of α,β-dibromopropionylchloride. On completion of the reaction the acylated dyestuff is salted out with sodium chloride, filtered and dried; it forms a black powder which gives in water a blue solution and in concentrated sulphuric acid a claret solution and dyes wool from a weakly acid bath in the presence of a levelling agent bluish green shades having good fastness properties.

EXAMPLE 6

A mixture of 48.4 parts of sodium 1-amino-4-bromoanthraquinone-2,7-disulphonate, 300 parts of water, 23.3 parts of 1-amino-4-acetylaminobenzene-2-carboxylic acid, 10 parts of sodium carbonate, 10 parts of sodium bicarbonate, 2 parts of copper sulphate and 1 part of copper powder is stirred at 70° to 75°C until the condensation is complete. The resulting dyestuff is precipitated, filtered and then saponified with dilute hydrochloric acid; it forms a black powder which gives in water a greenish blue solution and in concentrated sulphuric acid a violet solution.

The resulting dyestuff is acylated as described in Example 2, to yield a dark powder which gives in water a blue solution and in concentrated sulphuric acid a violet solution. It dyes wool from a weakly acid bath in the presence of a levelling agent blue-green shades having good fastness properties.

EXAMPLE 7

53.7 Parts of 1-amino-4-(4'-amino-2'-carboxyphenylamino)-anthraquinone-2,6-disulphonic acid are dissolved in 1,000 parts of water with a sufficient quantity of sodium hydroxide to produce a neutral solution. It is then cooled to 0°C and a solution of 18.5 parts of cyanuric chloride in 100 parts by volume of acetone is vigorously stirred in. The mixture is stirred at 0° to 5°C and maintained at a pH value between 6 and 6.5 by dropping in dilute sodium hydroxide solution. On completion of the condensation 17.3 parts of metanilic acid are strewn in, the reaction mixture is heated to 35°C and maintained at a pH value between 6 and 7 by dropping in dilute sodium hydroxide solution. The reaction is finished when alkali is no longer being consumed. The dyestuff is salted out with sodium chloride, filtered and dried under vacuum. It dyes cotton bluish green tints.

When the above-described neutral aqueous solution of 53.3 parts of 1-amino-4-(4'-amino-2'-carboxyphenylamino)-anthraquinone-2,6-disulphonic acid is condensed with 34.4 parts of the compound of the formula

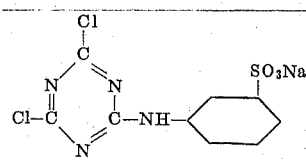

at 25° to 35°C and a pH value from 6 to 7, the identical dyestuff is obtained.

EXAMPLE 8

The intermediate dyestuff obtained in Example 7 is salted out with sodium chloride on completion of the cyanuration, filtered and dried at room temperature under vacuum. It dyes cotton by the conventional cold dyeing methods bluish green shades.

EXAMPLE 9

A solution of 18 parts of methoxydichlorotriazine in 100 parts by volume of acetone is stirred into the neutral aqueous solution of 53.3 parts of 1-amino-41(4'-amino-2'-carboxyphenylamino)-anthraquinone-2,6-disulphonic acid described in Example 7. At 25° to 35°C a pH value from 6 to 7 is maintained by dropping in dilute sodium hydroxide solution. On completion of the condensation the dyestuff is salted out with sodium chloride, filtered and dried under vacuum.

It dyes cotton by the usual padding and printing methods bluish green shades.

EXAMPLE 10

The neutral aqueous solution of 53.3 parts of 1-amino-4-(4'-amino-2°-carboxyphenylamino)-anthraquinone-2,6-disulphonic acid described in Example 7 is mixed with 100 parts of crystalline sodium acetate and a solution of 24 parts of 2,4,5,6-tetrachloropyrimidine in 200 parts of alcohol. The mixture is stirred for several hours at 50° to 60°C. On completion of the condensation the dyestuff formed is salted out with sodium chloride, filtered and dried. It dyes cotton fast, pure, bluish green shades.

Similar fibre-reactive dyestuffs can be obtained from the anthraquinone compounds listed in Column I of the following Table on treatment with the acylating agents of Column II as described in the Examples. The resulting fibre-reactive dyestuffs dye cotton bluish green shades.

| | I | II |
|---|---|---|
| 1 | 1-amino-4-(4'-amino-2'-carboxyphenylamino)-anthraquinone-2,6-disulphonic acid | 2,4-dichloro-6-phenylamino-1,3,5-triazine-2',5'-disulphonic acid |
| 2 | do. | 2,4-dichloro-6-phenylamino-1,3,5-triazine-2'-carboxy-5'-sulphonic acid |
| 3 | do. | 2,4-dichloro-6-phenylamino-1,3,5-triazine-2'-carboxylic acid |
| 4 | do. | 2,4-dichloro-6-phenylamino-1,3,5-triazine-2'- or -4'-sulphonic acid |
| 5 | do. | 2,4-dichloro-6-(4'-hydroxyphenylamino)-1,3,5-triazine-3'-carboxylic acid |
| 6 | do. | 2,4-dichloro-6-(2'-methylphenylamino)-1,3,5-triazine-4'-sulphonic acid |
| 7 | 1-amino-4-(4'-amino-2'-carboxyphenylamino)-anthraquinone-2,6-disulphonic acid | 2,4-dichloro-6-morpholino-1,3,5-triazine |
| 8 | do. | 2,4-dichloro-6-($\beta'$-hydroxyethylamino)-1,3,5-triazine |
| 9 | do. | 2,4,6-trichloro-5-bromopyrimidine |
| 10 | do. | 2,4,6-trichloropyrimidine |
| 11 | do. | 2,4,6-tribromopyrimidine |
| 12 | do. | 4,5-dichloropyridazone-(6)-yl-propionylchloride |
| 13 | do. | 2,3-dichloroquinoxaline-6-carboxylic acid chloride |
| 14 | do. | 1,4-dichlorophthalazine-6-carboxylic acid chloride |
| 15 | do. | 2,4-dichloroquinazoline-carboxylic acid chloride |
| 16 | do. | 2,6-dichloropyrimidine-4- or -5-carboxylic acid chloride |
| 17 | do. | 2,4-dichloropyrimidine-5-sulphonylchloride |
| 18 | do. | 3,6-dichloropyridazine-carboxylic acid chloride |
| 19 | do. | 2-methylsulphonyl-4-chloro-6-methylpyrimidine |
| 20 | do. | 2-methylsulphonyl-4,5-dichloro-6-methylpyrimidine |
| 21 | do. | 2-chlorobenzthiazole-6-carboxylic acid chloride |
| 22 | do. | 2,4-dichloropyrimidine-5-sulphonic acid |
| 23 | 1-amino-4-(4'-amino-2'-carboxyphenylamino)-anthraquinone-2,6-disulphonic acid | 2,4-dichloro-6-amino-1,3,5-triazine |
| 24 | do. | 2,4-dichloro-6-methoxytriazine |
| 25 | do. | 2,4-dichloro-6-phenoxytriazine |
| 26 | do. | 2,4-dichloro-6-phenylthio-triazine |
| 27 | do. | 2,4-dichloro-6-methyltriazine |
| 28 | do. | 2,4-dichloro-6-phenyltriazine |
| 29 | do. | 2,4-dichloro-6-($\beta$-sulphatoethylamino)-1,3,5-triazine |
| 30 | mixture of 1-amino-4-(4'-amino-2'-carboxyphenylamino)-anthraquinone-2,6- and -2,7-disulphonic acid | 2,4-dichloro-6-phenylamino 1,3,5-triazine-2',5'-disulphonic acid |
| 31 | do. | 2,4-dichloro-6-phenylamino-1,3,5-triazine-2'-carboxy-5'-sulphonic acid |
| 32 | do. | 2,4-dichloro-6-phenylamino-1,3,5-triazine-2'-carboxylic acid |
| 33 | do. | 2,4-dichloro-6-phenylamino-1,3,5-triazine-2'- or -4'-sulphonic acid |
| 34 | do. | 2,4-dichloro-6-(4'-hydroxyphenylamino)-1,3,5-triazine-3'-carboxylic acid |
| 35 | do. | 2,4-dichloro-6-(2'-methylphenylamino)-1,3,5-triazine-4'-sulphonic acid |
| 36 | do. | 2,4-dichloro-6-morpholino-1,3,5-triazine |
| 37 | mixture of 1-amino-4-(4'-amino-2'-carboxyphenylamino)-anthraquinone-2,6- and -2,7-disulphonic acid | 2,4-dichloro-6-($\beta$-hydroxyethylamino)-1,3,5-triazine |
| 38 | do. | 2,4,6-trichloro-5-bromopyrimidine |
| 39 | do. | 2,4,6-trichloropyrimidine |
| 40 | do. | 2,4,6-tribromopyrimidine |
| 41 | do. | 4,5-dichloropyridazone-(6)-yl-propionylchloride |

| | I | II |
|---|---|---|
| 42 | do. | 2,3-dichloroquinoxaline-6-carboxylic acid chloride |
| 43 | do. | 1,4-dichlorophthalazine-6-carboxylic acid chloride |
| 44 | do. | 2,4-dichloroquinazoline-carboxylic acid chloride |
| 45 | do. | 2,6-dichloropyrimidine-4- or -5-carboxylic acid chloride |
| 46 | do. | 2,4-dichlorpyrimidine-5-sulphonylchloride |
| 47 | do. | 3,6-dichloropyridazine carboxylic acid chloride |
| 48 | do. | 2-methylsulphonyl-4-chloro-6-methylpyrimidine |
| 49 | do. | 2-methylsulphonyl-4,5-dichloro-6-methylpyrimidine |
| 50 | do. | 2-chlorobenzthiazole-6-carboxylic acid chloride |
| 51 | do. | 2,4-dichloropyrimidine-5-sulphonic acid |
| 52 | do. | 2,4-dichloro-6-amino-1,3,5-triazine |
| 53 | do. | 2,4-dichloro-6-phenylamino-1,3,5-triazine-3'-sulphonic acid |
| 54 | mixture of 1-amino-4-(4'-amino-2'-carboxyphenylamino)-anthraquinone-2,6- and -2,7-disulphonic acid | cyanuric chloride |
| 55 | do. | 2,4,5,6-tetrachloropyrimidine |
| 56 | do. | 2,4-dichloro-6-methoxytriazine |
| 57 | do. | 2,4-dichloro-6-phenoxytriazine |
| 58 | do. | 2,4-dichloro-6-phenylthio-triazine |
| 59 | do. | 2,4-dichloro-6-methyltriazine |
| 60 | do. | 2,4-dichloro-6-phenyltriazine |
| 61 | do. | 2,4-dichloro-6-($\beta$-sulphatoethylamino)-1,3,5-triazine |
| 62 | mixture of 1-amino-4-(4'-amino-2'-carboxyphenylamino)-anthraquinone-2,5- and -2,8-disulphonic acid | 2,4-dichloro-6-phenylamino-1,3,5-triazine-2',5'-disulphonic acid |
| 63 | do. | 2,4-dichloro-6-phenylamino-1,3,5-triazine-2'-carboxy-5'-sulphonic acid |
| 64 | do. | 2,4-dichloro-6-phenylamino-1,3,5-triazine-2'-carboxylic acid |
| 65 | do. | 2,4-dichloro-6-phenylamino-1,3,5-triazine-2'- or -4'-sulphonic acid |
| 66 | do. | 2,4-dichloro-6-(4'-hydroxyphenylamino)-1,3,5-triazine-3'-carboxylic acid |
| 67 | do. | 2,4-dichloro-6-(2'-methylphenylamino)-1,3,5-triazine-4'-sulphonic acid |
| 68 | do. | 2,4-dichloro-6-morpholino-1,3,5-triazine |
| 69 | do. | 2,4-dichloro-6-($\beta'$-hydroxyethylamino)-1,3,5-triazine |
| 70 | do. | 2,4,6-trichloro-5-bromopyrimidine |
| 71 | mixture of 1-amino-4-(4'-amino-2'-carboxyphenylamino)-anthraquinone-2,5- and -2,8-disulphonic acid | 2,4,6-trichloropyrimidine |
| 72 | do. | 2,4,6-tribromopyrimidine |
| 73 | do. | 4,5-dichloropyridazon-(6)-yl-propionylchloride |
| 74 | do. | 2,3-dichloroquinoxaline-6-carboxylic acid chloride |
| 75 | do. | 1,4-dichlorophthalazine-6-carboxylic acid chloride |
| 76 | do. | 2,4-dichloroquinazoline-carboxylic acid chloride |
| 77 | do. | 2,6-dichloropyrimidine-4- or 5-carboxylic acid chloride |
| 78 | do. | 2,4-dichloropyrimidine-5-sulphonylchloride |
| 79 | do. | 3,6-dichloropyridazine carboxylic acid chloride |
| 80 | do. | 2-methylsulphonyl-4-chloro-6-methylpyrimidine |
| 81 | do. | 2-methylsulphonyl-4,5-dichloro-6-methylpyrimidine |
| 82 | do. | 2-chlorobenzthiazole-6-carboxylic acid chloride |
| 83 | do. | 2,4-dichloropyrimidine-5-sulphonic acid |
| 84 | do. | 2,4-dichloro-6-amino-1,3,5-triazine |

| | I | II |
|---|---|---|
| 85 | do. | 2,4-dichloro-6-phenylamino-1,3,5-triazine-3'-sulphonic acid |
| 86 | do. | cyanuric chloride |
| 87 | do. | 2,4,5,6-tetrachloropyrimidine |
| 88 | do. | 2,4-dichloro-6-methoxytriazine |
| 89 | do. | 2,4-dichloro-6-phenoxytriazine |
| 90 | mixture of 1-amino-4-(4'-amino-2'-carboxy-phenylamino)-anthra-quinone-2,5- and -2,8-disulphonic acid | 2,4-dichloro-6-phenylthio-triazine |
| 91 | do. | 2,4-dichloro-6-methyltriazine |
| 92 | do. | 2,4-dichloro-6-phenyltriazine |
| 93 | do. | 2,4-dichloro-6-(β'-sulphato-ethylamino)-1,3,5-triazine |
| 94 | 1-amino-4-(4'-amino-2'-carboxyphenylamino)-anthraquinone-2-sulphonic acid | 2,4-dichloro-6-phenylamino-1,3,5-triazine-2',5'-disulphonic acid |
| 95 | do. | 2,4-dichloro-6-phenylamino-1,3,5-triazine-2'-carboxy-5'-sulphonic acid |
| 96 | do. | 2,4-dichloro-6-phenylamino-1,3,5-triazine-2'- or -4'-sulphonic acid |
| 97 | do. | 2,4-dichloro-6-(4'-hydroxy-phenylamino)-1,3,5-triazine 3'-carboxylic acid |
| 98 | do. | 4,5-dichloropyridazone-(6)-yl-propionylchloride |
| 99 | do. | 2,3-dichloroquinoxaline-6-carboxylic acid chloride |
| 100 | do. | 2-methylsulphonyl-4-chloro-6-methylpyrimidine |
| 101 | do. | 2-methylsulphonyl-4,5-dichloro-6-methylpyrimidine |
| 102 | do. | 2,4-dichloropyrimidine-5-sulphonic acid |
| 103 | do. | 2,4-dichloro-6-phenylamino 1,3,5-triazine-3'-sulphonic acid |
| 104 | do. | cyanuric chloride |
| 105 | do. | 2,4-dichloro-6-(β-sulphato-ethylamino)-1,3,5-triazine |
| 106 | 1-amino-4-(4'-amino-2'-carboxyphenylamino)-anthraquinone-2-sulphonic acid | 2,4-dichloro-6-(N-sulphato-methyl-N-phenylamino)-1,3,5-triazine |
| 107 | do. | trichloropyrimidine |
| 108 | do. | 2,4-dichloro-6-(β-hydroxy-ethylamino)-1,3,5-triazine |
| 109 | do. | 2,4-dichloro-6-(N-methyl-N-phenylamino)-1,3,5-triazine |

EXAMPLE 11

The dichlorotriazinylamino-anthraquinone dyestuff described in Example 7 is condensed with 48.7 parts of the azo dyestuff of the formula

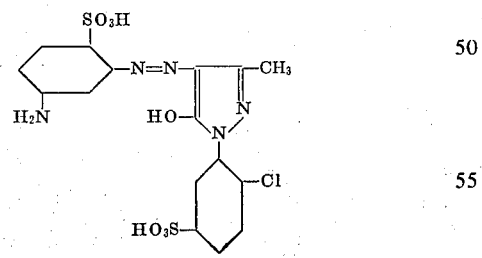

at 30° to 50°C and a pH value of 5 to 7. The dyestuff formed is salted out with potassium chloride, filtered and dried; it dyes cotton fast green shades.

The same dyestuff as described above is obtained when in an analogous manner the azo dyestuff is first cyanurated and then condensed with the anthraquinone component.

Similar fibre-reactive dyestuffs are obtained when equivalent amounts of the following azo dyestuffs are used:

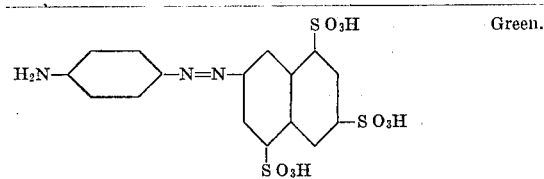
Green.

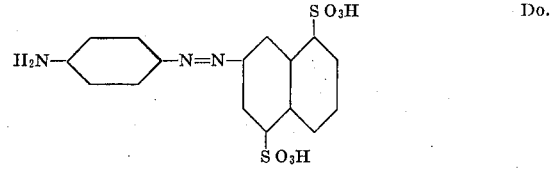
Do.

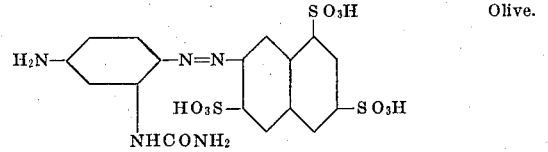
Olive.

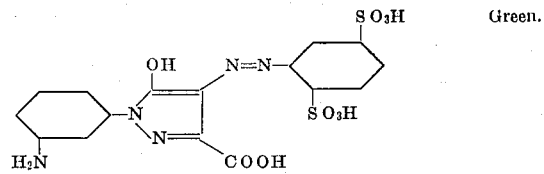
Green.

Dyeing instruction

100 Parts of knitting wool are immersed at 50° to 80°C in a dyebath containing in 3,000 parts of water 10 parts of crystalline sodium sulphate, 6 parts of 40 percent acetic acid, 0.5 part of the adduct described below from oleylamine and ethylene oxide, and 2 parts of dyestuff. The bath is heated during half an hour to the boil and the wool is then dyed for one hour at the boil, rinsed and dried.

Manufacture of the ethylene oxide adduct

A mixture of 100 parts of commercial oleylamine and 1 part of finely disperse sodium is heated to 140°C, whereupon ethylene oxide is introduced at 135° to 140°C. As soon as the ethylene oxide is rapidly absorbed, the reaction temperature is lowered to 120° to 125°C and the introduction of ethylene oxide is continued until 113 parts of ethylene oxide have been absorbed. The resulting reaction product gives a practically clear solution in water.

We claim:

1. A dyestuff of the formula

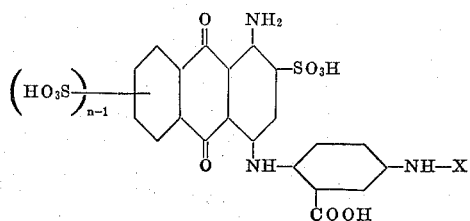

in which $n$ is 1 or 2, X is $\alpha,\beta$-dibromopropionyl or $\alpha$-bromoacryl and $n$ can be 1 only when X is dibromopropionyl.

2. The dyestuff as claimed in claim 1, which corresponds to the formula

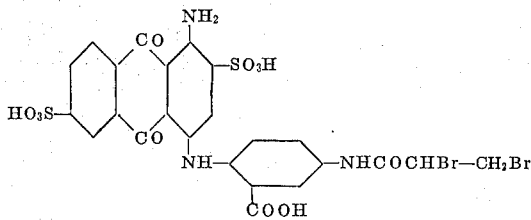

3. The dyestuff as claimed in claim 1, which corresponds to the formula

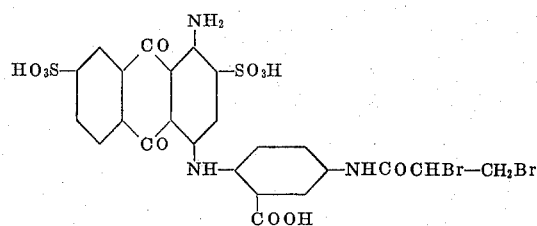

4. The dyestuff as claimed in claim 1, which corresponds to the formula

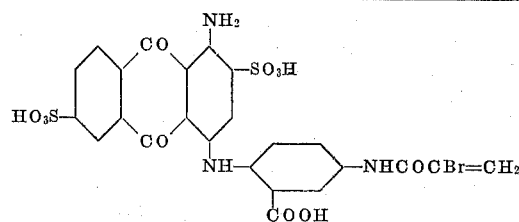

5. The dyestuff as claimed in claim 1, which corresponds to the formula

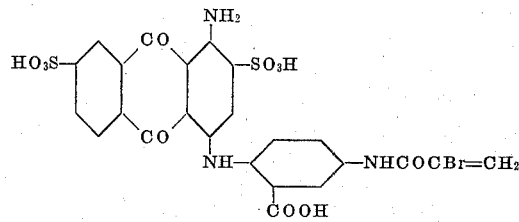

6. The dyestuff as claimed in claim 1, which corresponds to the formula

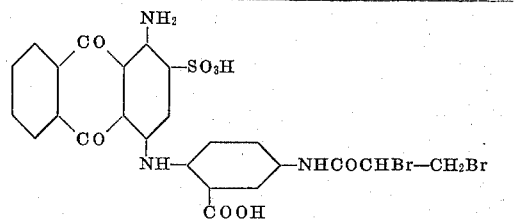

* * * * *